United States Patent [19]

Wiknich et al.

[11] 4,349,099

[45] Sep. 14, 1982

[54] ACCUMULATING CONVEYOR

[75] Inventors: Douglas D. Wiknich, Holly; Michael J. Peabody, Troy, both of Mich.

[73] Assignee: LaSalle Machine Tool, Inc., Troy, Mich.

[21] Appl. No.: 144,631

[22] Filed: Apr. 28, 1980

[51] Int. Cl.$^3$ .................... B65G 25/00; B65G 43/08
[52] U.S. Cl. .................................. 198/751; 198/718
[58] Field of Search ............... 198/460, 718, 751, 774

[56] References Cited

U.S. PATENT DOCUMENTS 3,687,275 8/1972 Broser .............................. 198/751
4,240,542 12/1980 Wicknich ......................... 198/751

Primary Examiner—Andres Kashnikow
Assistant Examiner—Douglas D. Watts
Attorney, Agent, or Firm—Olsen and Stephenson

[57] ABSTRACT

An accumulating conveyor adapted to advance articles from station to station comprising an elongated support along which the stations are longitudinally spaced apart, a transfer bar movable forwardly and rearwardly longitudinally of the elongated support, independently movable feed units on the transfer bar, and means for moving the feed units to feed positions so that upon an initial rearward movement of the transfer bar from a start position all feed units behind an empty station are moved to their feed positions. A work transfer cycle then is completed by moving the transfer bar forwardly to advance the articles behind the empty station to their next adjacent stations and then returning the transfer bar to its start position. Sensor assemblies corresponding to the stations operate to sense empty stations and means including a connecting chain are operable in response to sensing of an empty station to provide for a connection of all sensor assemblies to the rear of the empty station and consequent advance of all articles to the rear of the empty station when the transfer bar is next moved forwardly.

19 Claims, 6 Drawing Figures

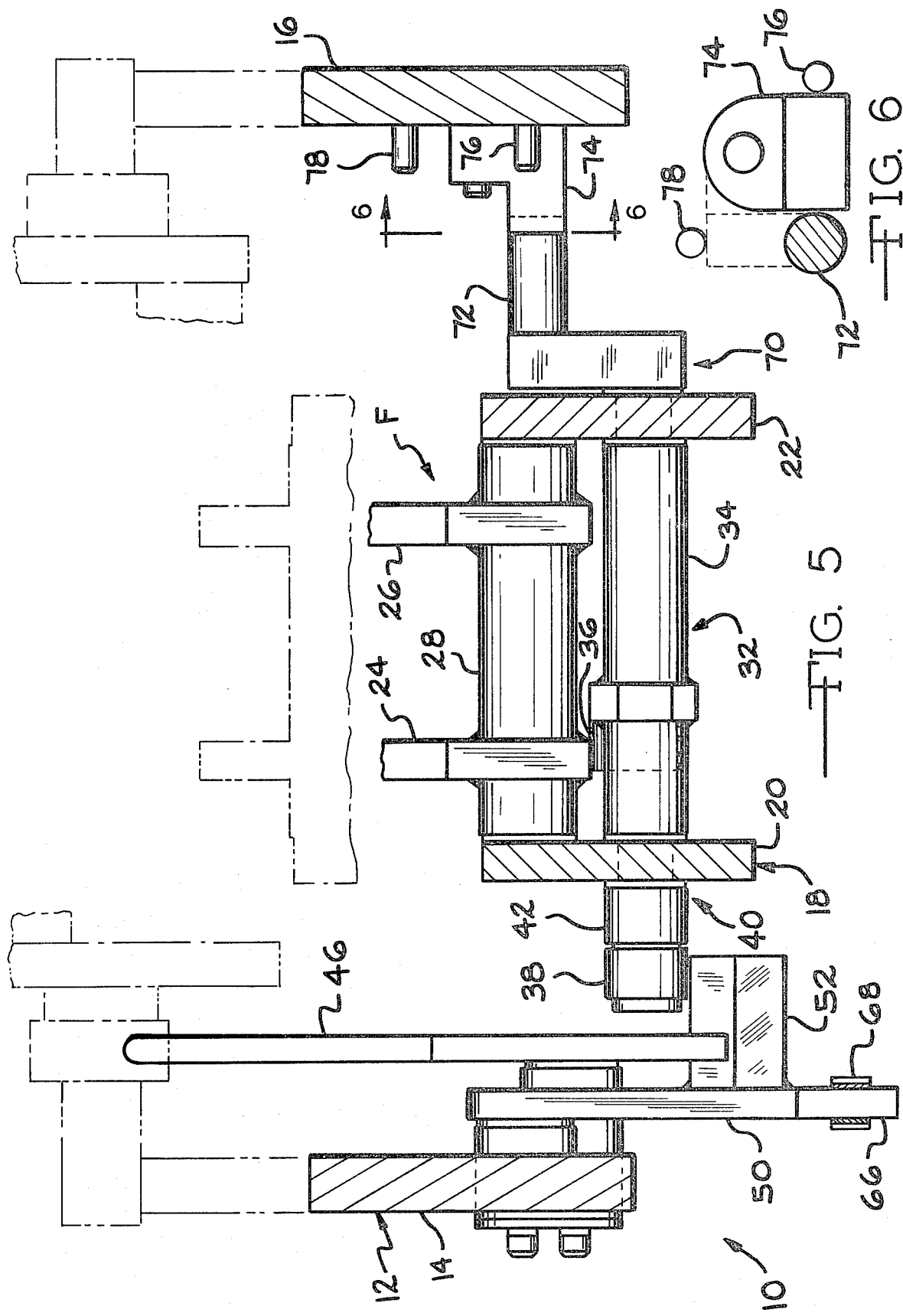

ACCUMULATING CONVEYOR

Related Application

This application discloses a conveyor similar to the conveyor disclosed in co-pending application Ser. No. 144561 filed Apr. 28, 1980 assigned to the assignee of this application.

BACKGROUND OF THE INVENTION

The present invention relates to a mechanical accumulating conveyor intermittently operable to advance articles through a series of stations to ensure that any empty station will be occupied by an article. A number of mechanical accumulating conveyors have been developed that require no electrical or fluid operated components to advance articles intermittently through longitudinally spaced-apart stations. As disclosed in U.S. Pat. No. 3,547,254, a mechanical accumulating conveyor employs a transfer slide having a plurality of independently movable feed members that are moved between idle and feed positions, mechanical sensors at each station, and rigid segment bars operable to move all feed members behind an empty station to their feed positions during the initial movement of the transfer bar. In particular, U.S. Pat. No. 3,547,254 discloses a mechanical accumulating conveyor wherein the feed members behind an empty station are moved to their feed positions upon an initial forward movement of the transfer bar. These prior art mechanical accumulating conveyors have performed satisfactorily. However, they tend to be costly, they require considerable maintenance, and they are complex and difficult to build and assemble.

It is the general object of the present invention, therefore, to provide an improved mechanical accumulating conveyor adapted to move independently movable feed units to feed positions upon an initial rearward movement of a transfer slide from a start position.

Another object of this invention is to provide a mechanical accumulating conveyor in which the work advancing mechanisms corresponding to the work stations are independent of each other and the work sensor assemblies at the stations are connected by flexible connectors.

It is another object of this invention to provide a mechanical accumulating conveyor in which the moving components are located below and between the sides of the conveyor so as to provide a safe conveyor.

SUMMARY OF THE INVENTION

The present invention provides a mechanical accumulating conveyor comprising an elongated support along which a plurality of articles are movable through a series of longitudinally spaced-apart stations. A transfer bar is mounted for movement forwardly and rearwardly longitudinally of the elongated support and for up and down movement relative to the elongated support. The transfer bar carries a plurality of independently movable feed units that are movable between idle and feed positions. The transfer bar also carries a plurality of feed unit setting assemblies each being associated with a separate feed unit and operable when moved to an actuated position to move its associated feed unit to the feed position. The transfer bar is movable through a work transfer cycle commencing with the transfer bar in a starting position from where it initially is moved rearwardly with respect to the elongated support to set all feed units behind an empty station to feed positions, then upwardly and forwardly to advance all articles behind an empty station to their next adjacent stations. The transfer bar then is lowered and returned to its start position.

The accumulating conveyor also includes a mechanical sensor at each station operable to sense the absence of an article. The sensor comprises a sensing bar pivotally mounted on the elongated support and pivotally movable between an article-sensed position and an empty station position with the sensing bar being gravitationally biased to the empty station position. Actuator members are mounted on the elongated support at the stations and are pivotally swingable between operative and inoperative positions. The actuator members carry projections on which are provided cam surfaces. These cam surfaces are located so as to be engaged by an associated follower member on the feed unit setting assemblies when the transfer bar initially is moved rearwardly from a start position. Chain sections connect the actuator members and operate to hold all actuator members in operative positions behind a first actuator member maintained in an operative position.

The sensor at an empty station is positioned in its empty station position. Cooperating catch means on the sensing bar and on the corresponding actuator member at the next following station engage holding the corresponding actuator member in its operative position. The chain sections connecting the actuator member serve to hold all actuator members behind the corresponding actuator member in their operative positions. Upon an initial rearward movement of the transfer bar, follower members on the feed unit setting assemblies at all the stations engage cam surface portions on their associated actuator members. Those actuators members in front of an empty station are swung to their inoperative positions when the follower members on the feed unit setting assemblies engage their cam surface portions since they are not held in their operative positions. Those actuator members behind the empty station are held in their operative positions so that the follower members on the feed unit setting assemblies ride on their cam surfaces held in fixed positions to cause the feed unit setting assemblies associated therewith to be pivoted to their actuated positions. The movement of the feed unit setting assemblies to their actuated positions causes them to engage and move their associated feed units to feed positions directly below the articles at the stations behind the empty station. A subsequent raising of the transfer bar causes the feed members in feed positions to lift the articles from their stations. The transfer bar then is advanced through a distance approximately equal the spacing between the stations to advance the articles to their adjacent stations. The transfer bar then is lowered depositing the articles at their next adjacent stations and is returned to its start position. During the return movement of the transfer bar, knockdown units operate to return all feed units in feed positions to their idle positions. The work transfer cycle then is repeated to advance all articles to the last station and to insure that any empty stations behind the last or any intermediate empty station are filled.

Further objects, features and advantages of the present invention will become apparent from a consideration of the following description, the appended claims, and the accompanying drawing in which:

FIG. 5 is a transverse sectional view of the accumulating conveyor taken substantially from lines 5—5 in FIG. 2; and FIG. 6 is a fragmentary sectional view of the accumulating conveyor showing a knockdown member and taken substantially from line 6—6 in FIG. 5.

Figure 1:
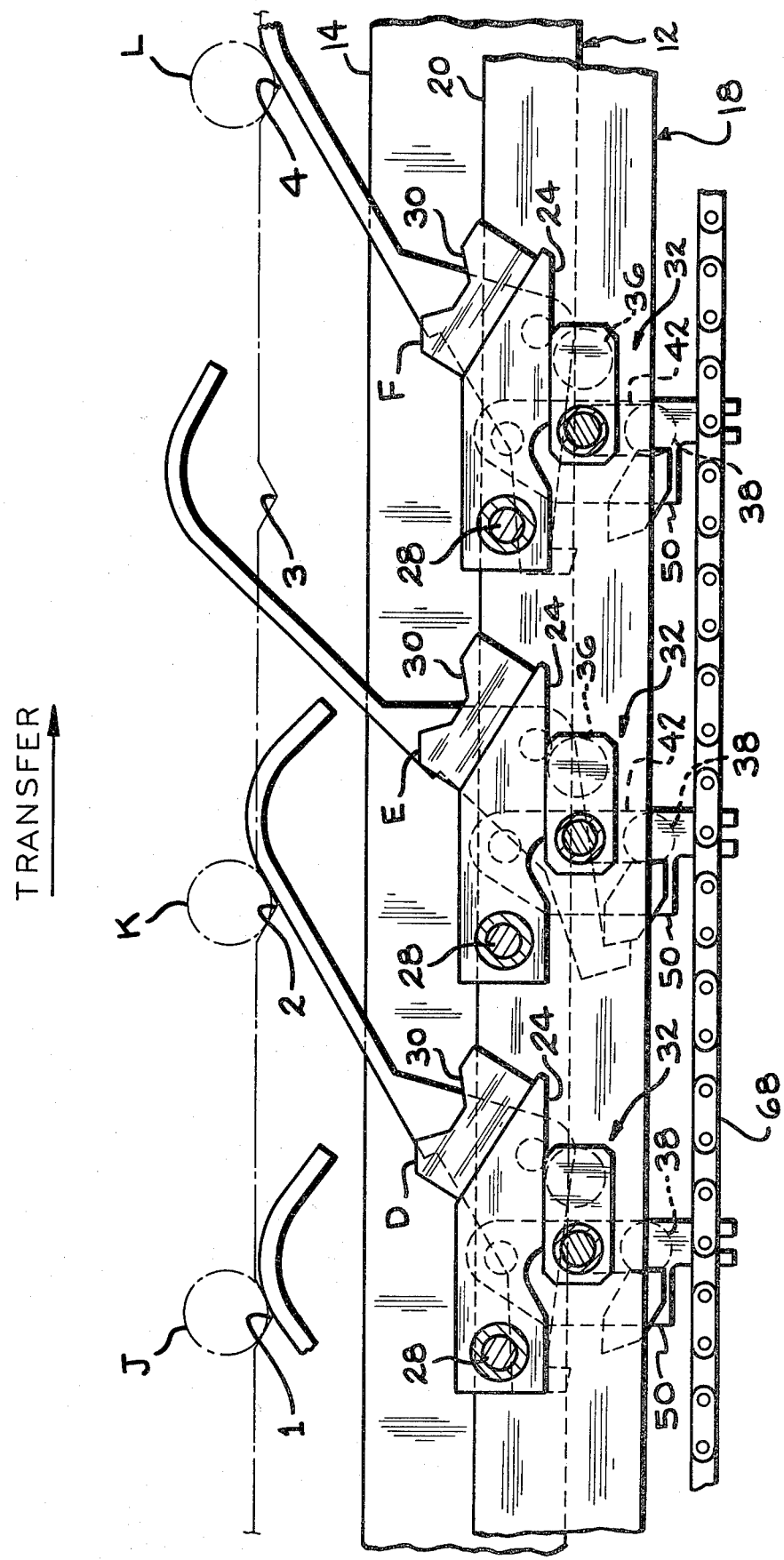
FIG. 1 is a fragmentary elevational view of a portion of the accumulating conveyor of this invention with portions broken away for the purpose of clarity.

Referring to the drawing, the accumulating conveyor of the present invention, indicated generally at 10, is shown in FIG. 1 consisting of an elongated support 12 formed by a pair of parallel rails 14 and 16 (FIG. 5). The rails 14 and 16 are components of a stationary frame installed at a selected site. A series of longitudinally spaced stations 1, 2, 3, 4, etc. are provided on the elongated support 12 through which a plurality of articles, I, J, K, and L are movable. It is to be understood that there are stations behind station 1 and in front of station 4 and that as viewed in FIGS. 1-4, the articles are advanced forwardly from left to right. Stations 1, 2, and 4 are occupied by the articles J, K, and L while station 3 is empty.

The accumulating conveyor 10 includes a transfer bar 18 that consists of a pair of parallel rails 20 and 22 that are movable forwardly to the right and rearwardly to the left longitudinally of the elongated support 12 and up and down with respect to the elongated support 12. Suitable drive means (not shown) are provided for moving the transfer bar 18 through a work cycle commencing with the transfer bar in a start position, shown in FIG. 1. Such a drive means is illustrated in the above-identified co-pending application. The initial movement of the transfer bar 18 is rearwardly from its FIG. 1 position to its FIG. 2 position, then upwardly to its FIG. 3 position and forwardly through a distance essentially equal to the spacing between adjacent stations to its FIG. 4 position. The transfer cycle is completed by movement of the transfer bar 18 downwardly and rearwardly to its FIG. 1 position.

Figure 2:
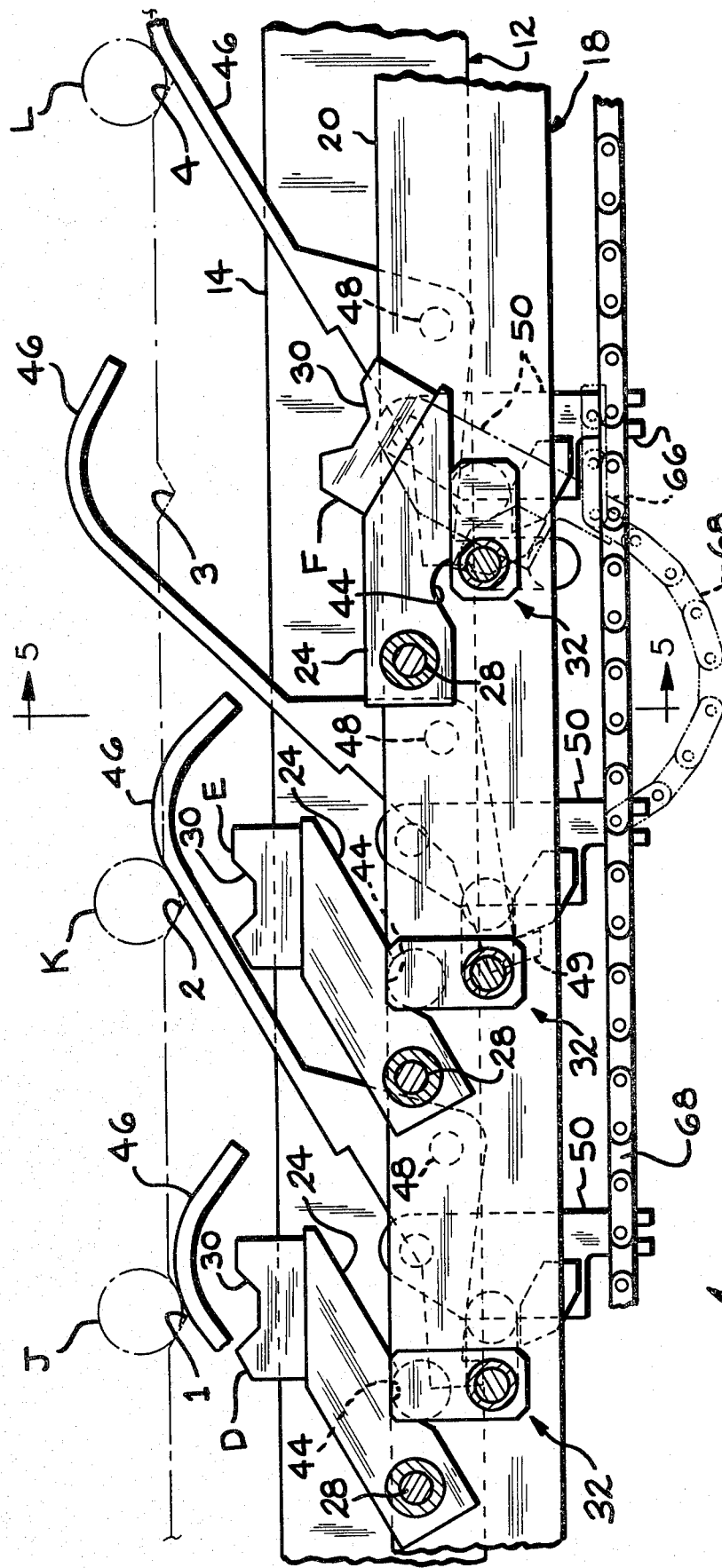
FIGS. 2-4 are views of the accumulating conveyor similar to the view in FIG. 1, but showing the accumulating conveyor at different positions during an article transfer cycle, and showing the front actuator in inoperative position in FIG. 2

The transfer bar carries a plurality of feed units indicated by the letters D, E, and F in FIG. 1. The feed units are pivotally mounted on the transfer bar 18 and are spaced apart longitudinally of the elongated support 12 to correspond with the spacing of the stations 1-4. As shown in FIG. 5, the feed unit F is pivotally mounted on the parallel rails 20 and 22. The feed unit F and remaining feed units each consists of a pair of parallel feed arms 24 and 26 fixed to a shaft 28 that extends transversely of and is connected to the parallel rails 20 and 22. Each feed arm 24 and 26 has at its free end a nest or cradle 30 adapted to support and lift an article for moving an article from one station to the next adjacent station. As shown in FIG. 2, the arms 24 and 26 are movable between idle and feed positions. Feed unit F is shown in its idle position and the feed units D and E are shown in their feed positions in FIG. 2 pivoted counterclockwise from their idle positions. The feed arms 24 and 26 of each feed unit are pivotally movable between their idle and feed positions through an angle that is no greater than forty-five degrees and preferably through an angle of approximately thirty degrees. Accordingly, when the feed unit returns from its feed position to its idle position against a stop (not shown), a minimum amount of noise will be generated since the feed arms 24 and 26 travel through a short angular distance.

Associated with each feed unit is a feed unit setting assembly 32 which is pivotally mounted on the transfer bar 18. The assembly 32 (FIG. 5) consists of a shaft 34 rotatably mounted on and extended through the transfer bar rails 20 and 22 at a location below the shaft 28 for the associated feed unit. A pusher arm 36 extends radially from and is connected to the shaft 34 between the shaft ends. A follower member 38 is connected to the end 40 of the shaft 34 by an arm 42 which is generally at right angles with respect to the pusher arm 36.

Each feed unit setting assembly 32 is pivotally movable between a rest position and an actuated position. As shown in FIG. 2, the feed unit setting assemblies 32 associated with the feed units D and E are in their actuated positions and the feed unit setting assembly 32 associated with the feed unit F is in a rest position displaced approximately ninety degrees clockwise from its actuated position. The pusher arms 36 on the feed unit setting assemblies 32 associated with the feed units D and E are disposed in recesses 44 formed in the arms 24 of the feed units D and E holding them in their feed positions.

An article sensor assembly 45 is provided at each station and includes a sensing bar 46 pivotally mounted on the rail 14 of the elongated support 12 for pivotal movement between an article-sensed position and an empty station position. As shown in FIG. 2, the sensing bars 46 associated with stations 1, 2, and 4 are in their article-sensed position and the sensing bar 46 at station 3 is shown pivoted counterclockwise to an empty station position. The sensing bars 46 are pivotally mounted by pins 48 so that each has a center of gravity located relative to the pin 48 that biases the sensing bars 46 to its empty station position. Accordingly, the articles J, K, and L at the stations 1, 2, and 4 overcome the gravitational biasing of the sensing bars 46 and hold them in their article-sensed positions. Each sensor 46 has a front or lower arm 47 having a notched portion 49. The arm 47 extends rearwardly from the pin 48 on the sensor bar 46 and swings coincidentally with the sensing end of the bar 46.

The sensor assemblies 45 also include a plurality of actuator members 50 pivotally mounted on the rail 14 and corresponding to the work stations. Each actuator member 50 is pivotally movable between an operative and an inoperative position and is gravitationally biased toward its operative position. As shown in FIG. 2, the actuator members 50 associated with stations 1 and 2 are in their operative positions and the actuator member 50 associated with the station 3 is in an upwardly and rearwardly pivoted inoperative position. Each actuator member 50 has an inwardly extending projection 52 (FIG. 5) having an upright cam surface 56, an inclined cam surface 58, bottom cam surfaces 60 and 62, and a forwardly extending converging nose 64 (FIGS. 3 and 4) adapted to engage the notched portion 49 on the associated sensor 46. Each actuator member 50 also has a downwardly extending bifurcated arm 66 to which a chain 68 is affixed. The chain 68 connects adjacent actuator members 50 and serves to hold all actuator members 50 in operative positions behind a first actuator member 50 maintained in its upright operative position.

Attached to the end 70 (FIGS. 5 and 6) of the rod 34 is a radially extending arm 72 which is located at right angles to the position of the follower member 38. Associated with each feed unit setting assembly 32 is a knockdown lug or member 74 which is pivotally connected on the rail 16 and which is engaged by the arm 72 of a feed unit setting assembly 32 when in the actuated position to pivot the feed unit setting assembly 32 to the rest position upon the return stroke of the transfer bar 18 to its start position. Stop pins 76 and 78 limit the pivotal movement of the knockdown member 74.

The stop pin 78 allows the knockdown member 74 to be swung forwardly in case the transfer bar 18 is inadvertently advanced while in its lower position. Counterclockwise pivoting, as seen in FIG. 6, is limited by the stop pin 76. The view in FIG. 5 shows the parts being advanced away from the viewer. The transfer bar 18 is shown lowered and in the return stroke with the feed unit setting assembly 32 associated with the feed unit F in the actuated position. A continued rearward movement of the transfer bar 18 will cause the arm 72 to engage the knockdown lug 74 pivoting the feed unit setting assembly 32 to the rest position. There is a knockdown lug 74 for each feed unit setting assembly 32 so that each is independently returned to its rest position. Once the arms 36 on the feed units have been displaced from the recesses in the arms 24, the gravitational movement of the feed units will insure that they are returned to their idle positions.

As can be seen in FIG. 5, many of the components including the feed units and feed unit setting assemblies 32 are located between and below the rails 14 and 16 of the elongated support 12. The central location of the components reduces the likelihood of injury to personnel in the vicinity of the conveyor. Most moving components are out of the way and thus provide a safely operating conveyor.

In operation, assume initially that stations 1, 2, 4, and all stations in front of station 4 and behind station 1 are occupied as shown in FIG. 1. Only station 3 is empty. Thus, the transfer bar 18 will be moved through a work transfer cycle to advance article K from station 2 to station 3, to advance article J from station 1 to station 2, and to advance all articles at the stations behind station 1 to their next adjacent stations so that station 3 and all following stations are occupied with articles. Because station 3 is empty, the sensing bar 46 is gravitationally urged toward its empty station position as shown in FIG. 1. The notched portion 49 on the front arm 47 of the sensor 46 engages and receives the converging nose portion 64 of the actuating member 50 associated with the next following station 2. The sensing bars 46 associated with stations 1, 2, and 4 are shown in their article-sensed position resulting from the occupation of the stations 1, 2, and 4 by the articles J, K, and L. Their notched portions 49 are swung into a clearance relationship with the nose portions 64 of their corresponding actuator members 50.

The work transfer cycle commences with the transfer bar 18 in a start position, as shown in FIG. 1. It should be understood that the FIG. 1 position of the conveyor is selected here as the "start" position for purposes of clarity of description of a work cycle. In practice, other points in the cycle are sometimes referred to as the start. The nests 30 on the feed units D and E are located slightly forwardly of the articles J and K at their associated stations 1 and 2. The initial rearward movement of the transfer bar 18 is rearwardly with respect to the elongated support 12 to its FIG. 2 position.

Each follower member 38 on the feed unit setting assemblies 32 initally strikes the upright cam surface 56 on its associated actuator member 50. The member 50 and the associated follower 38 thus form an interference means for moving a feed unit setting assembly 32 to the actuated position. Because the actuator member 50 associated with station 2 is held in its operative position by the corresponding sensing member 46 associated with station 3, the follower member 38 upon rearward movement of the transfer bar 18 rides on the surfaces 56 and 58 causing the feed unit setting assembly 32 associated with the feed unit E to be pivoted to its actuated position. This causes the feed unit E to be raised to its feed position as the pusher arm 36 is pivoted counterclockwise to an upright position.

Since the corresponding actuator plate 50 held by the sensing bar 46 is maintained in an operative position, the chain 68 serves to hold the remaining actuator members 50 behind station 2 in their operative positions. Accordingly, the follower members 38 on the following feed unit setting assemblies 32 also ride the cam surfaces 56 and 58 so as to pivot their push arms 36 to upright positions.

The feed unit F remains in its idle position during the initial rearward movement of the transfer bar 18. The follower member 38 on the feed unit setting assembly 32 associated with the feed unit F engages the upright cam surface 56 on the actuator member 50 associated with station 3 and because the actuator member 50 is not maintained in its operative position by the sensing bar 46 at station 4, it is free to swing clockwise when engaged by the follower member 38. The follower member 38 rides along the bottom surfaces 60 and 62 and remains in its rest position as the actuator member 50 is moved to its inoperative position (shown in broken lines in FIG. 2) so that the feed unit F also remains in its idle position. Likewise, all feed unit setting assemblies 32 in front of station 3 will remain in their rest positions since the actuator members 50 in front of station 3 will be moved to their inoperative positions as the sensing bars 46 are in their article-sensed positions. The chain 68 between stations 2 and 3 becomes slack to accommodate the swinging movement of the actuator member 50 associated with feed unit F to its inoperative position during the initial rearward movement of the transfer bar 18.

Figure 3:
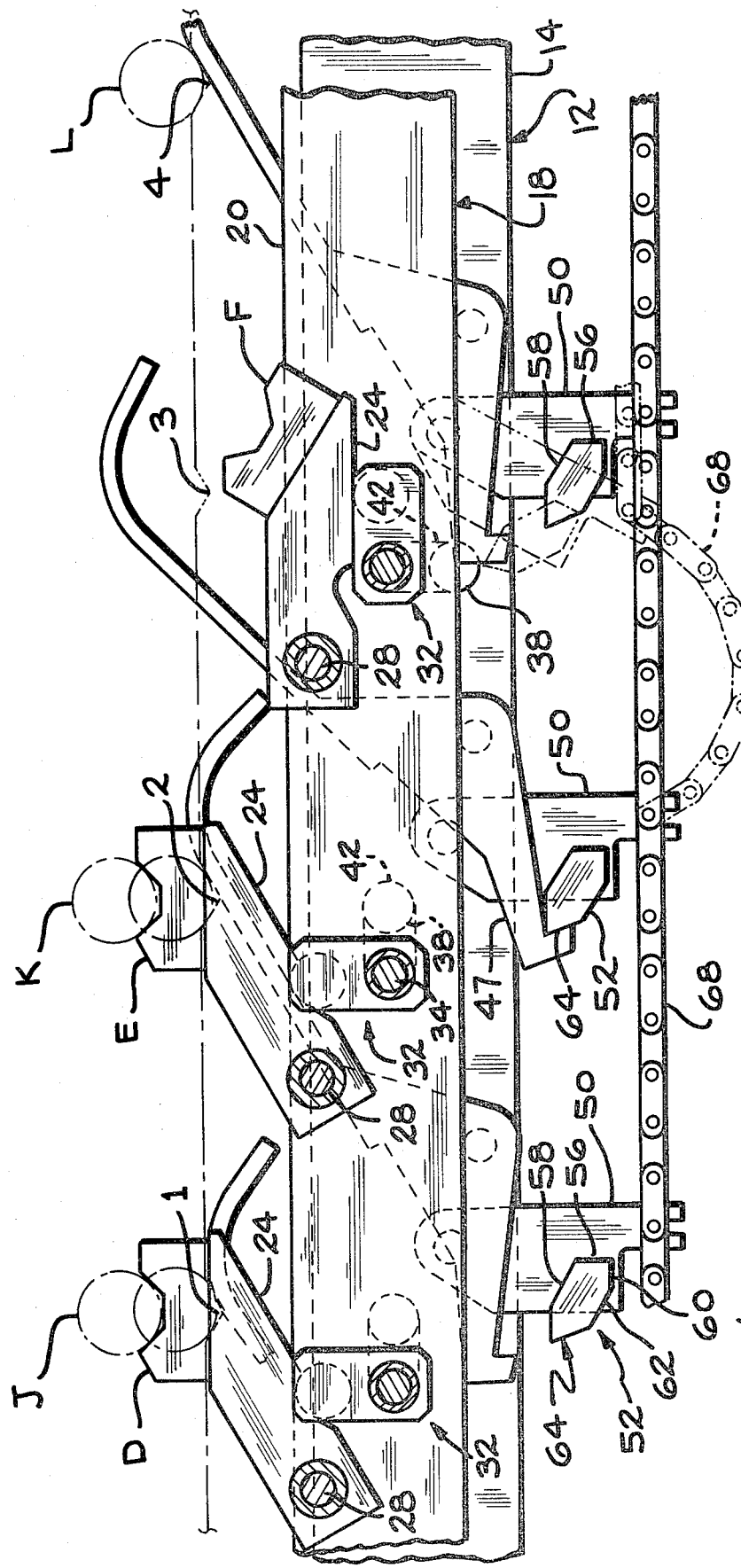
Figure 4:
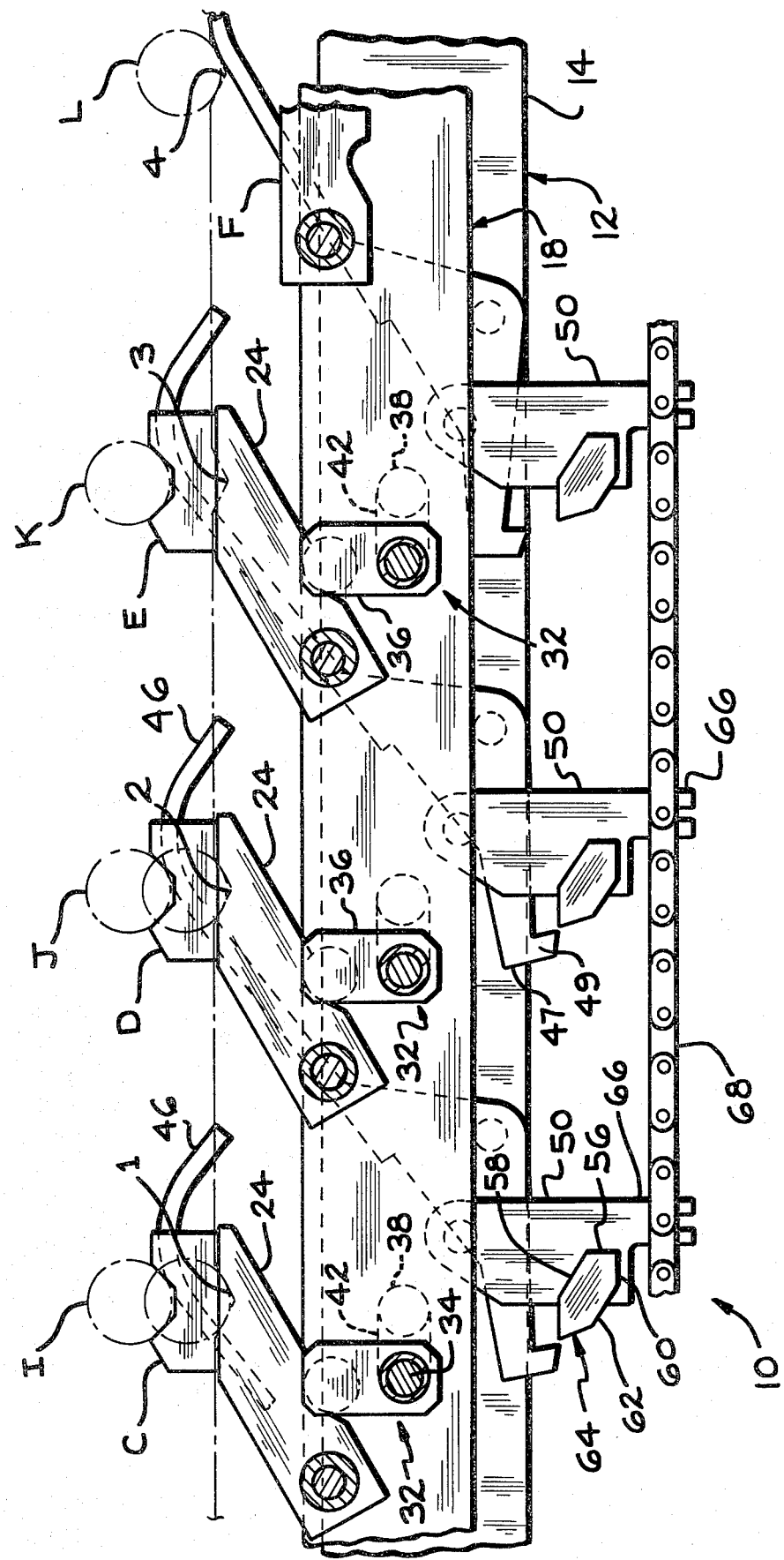

The transfer bar 18 then is raised to its FIG. 3 position allowing the cradles 30 to engage and lift the articles J and K from the stations 1 and 2. The transfer bar 18 is then advanced forwardly to its FIG. 4 position to move the articles J and K to their next adjacent stations 2 and 3. Article I has been advanced from the next following station to station 1 by the feed unit C. The previously empty station 3 is then filled with a part. As can be seen in FIGS. 2–4, once the follower member 38 associated with feed unit F clears the cam portions 60 and 62 on the actuator member 50, the actuator member 50 is free to swing back under gravitation to its normal upright position as shown in FIG. 4.

After the transfer bar 18 has been advanced forwardly to deposit the articles at their next adjacent stations as shown in FIG. 4, it is lowered and returned to its start position shown in FIG. 1. After the transfer bar has been lowered, the return movement causes the arms 72 on all feed unit setting assemblies 32 in the actuated position to engage their associated knockdown lugs 74. The engagement of the arms 72 with the knockdown lugs 74 pivots the shafts 34 on the feed unit setting assemblies 32 clockwise as viewed in FIGS. 1–4 to withdraw the pusher arms 36 from their associated pockets 44 in the feed arms 24. Once clear from the pockets 44, the pusher arms 36 return to their rest positions as the feed unit setting assembly 32 continues its clockwise rotation to the rest position. The accumulating conveyor 10 is then in a position ready to commence another work transfer cycle.

The accumulating conveyor 10 readily can be adapted to a pusher type by changing the positions of the feed units so that when they are moved to their feed positions, they will be located slightly behind the articles. A following advancement of the transfer bar 18 will push the articles to their next adjacent stations.

From the above description, it can be seen that this invention provides an improved accumulating conveyor 10 in which initial rearward movement of the transfer bar 18 places all feed units behind an empty station in feed positions. The accumulating conveyor utilizes the chain 68 to maintain all actuator members 50 in their operative positions behind an empty station so that all feed units behind the empty station are moved to their feed positions. The flexible chain 68 allows the actuator members 50 in front of an empty station to be swung to inoperative positions so as not to affect those feed unit setting assemblies in front of the empty station. The accumulating conveyor 10 does not generate excessive noise during operation, requires little maintenance, and, if necessary, is easily serviced.

At each of the stations, 1, 2, 3, 4, etc., there is a work-advancing mechanism comprising a feed unit D, E, or F and a feed unit setting assembly 32. Importantly, in the conveyor 10, these mechanisms are independent, namely, unconnected. This imparts mechanical simplicity to the conveyor 10, particularly when it is assembled with other conveyors and work-handling parts in a factory. Further, since the feed units are moved to feed positions in response to rearward movement of transfer bar 18, as contrasted with upward movement, the amount of vertical movement of the transfer bar that is required in a work cycle is reduced.

What is claimed:

1. An accumulating conveyor comprising an elongated support along which a plurality of articles are movable through a series of longitudinally spaced-apart stations, a transfer bar mounted for movement forwardly and rearwardly longitudinally of said elongated support, and for up and down movement relative to said elongated support, a plurality of feed units on said transfer bar movable between idle and feed positions, drive means for moving said transfer bar back and forth through a work cycle commencing with the transfer bar in a start position for moving each of said feed units from one station to the next adjacent station to advance the articles to fill any empty stations, a plurality of feed unit setting assemblies on said transfer bar and operatively associated with said feed units, each of said feed unit setting assemblies being movable between rest and actuated positions and being operable when moved to the actuated position to move an associated feed unit to the feed position, a plurality of actuator members mounted at said stations for movement between operative and inoperative positions, each of said actuator members being operatively associated with a selected feed unit setting assembly, sensing means at each station for sensing the absence of an article, each of said sensing means being operatively associated with a corresponding actuator member at the next following station, and means connecting adjacent ones of said actuator members to maintain all actuator members in operative positions behind a first actuator member maintained in the operative position, said sensing means at an empty station causing the corresponding actuator member to be maintained in an operative position so that upon an initial rearward movement of said transfer bar from said start position said feed unit setting assemblies engage all actuator members held in operative positions and in response to such engagement move to actuated positions to move their associated feed units to feed positions.

2. The accumulating conveyor according to claim 1, wherein said sensing means and said actuator members are mounted on said elongated support at selected positions associated with said stations.

3. The accumulating conveyor according to claim 1, wherein each of said actuator members is pivotally mounted on said elongated support relative to an associated station for pivotal movement between said operative and inoperative positions, and means biasing said actuator members to their operative positions.

4. The accumulating conveyor according to claim 3, wherein said actuator members are gravitationally biased to to their operative positions.

5. The accumulating conveyor according to claim 2, wherein each of said actuator members is pivotally mounted on said elongated support for pivotal movement between said operative and inoperative positions, each of said sensing means being pivotally mounted on said elongated support for pivotal movement between an article sensed position and an empty station position, means biasing said sensing means at each station to the empty station position in the absence of an article at said station, coacting means on said sensing means and on said corresponding actuator member operable to maintain said corresponding actuator member behind an empty station in the operative position when said sensing means is in the empty station position, said connecting means operating to maintain all actuator members behind said corresponding actuator member in operative positions.

6. The accumulating conveyor according to claim 5 and further including cam surface portions on each of said actuator members and a follower member on each of said feed unit setting assemblies, said follower member of an associated feed unit setting assembly riding on said cam surface portions of said corresponding actuator member held in an operative position during the initial rearward movement of said transfer bar to cause said associated feed unit setting assembly to be moved to the actuated position.

7. The accumulating conveyor according to claim 6, wherein said follower members on said remaining feed unit setting assemblies engage the surface portions of the free actuator members not held in operative positions causing said free actuator members to be moved to inoperative positions during said initial rearward movement of said transfer bar.

8. The accumulating conveyor accordingly to claim 1, wherein said connecting means comprises chain sections connecting adjacent actuator members.

9. The accumulating conveyor according to claim 1, wherein each of said feed units is pivotally mounted on said transfer bar for movement between said idle and feed position through an angle that is no greater then forty-five degrees.

10. The accumulating conveyor according to claim 1 and further including knockdown means associated with each of said feed unit setting assemblies to move said feed unit setting assemblies in the actuated positions to rest position upon return movement to said start position.

11. The accumulating conveyor according to claim 1, wherein said drive means moves said transfer bar through a cycle commencing with said transfer bar in a start position, said drive means moving said transfer bar rearwardly from said start position, then upwardly, forwardly to advance each feed unit from one station to the next adjacent station, downwardly and then rearwardly back to said start position.

12. An accumulating conveyor comprising an elongated support along which a plurality of articles are movable forwardly through a series of longitudinally spaced-apart stations, a transfer bar mounted for movement back and forth longitudinally of said elongated support, a plurality of feed units supported solely on said transfer bar and spaced apart longitudinally of said elongated support, shaft means corresponding to each of said feed units, said shaft means extending through said transfer bar and constituting the support for said feed units, said feed units being pivotally movable about said shaft means between idle and feed positions, drive means for moving said transfer bar through a cycle commencing with an initial rearward movement of said transfer bar from a start position for moving each of said feed units from one station to the next adjacent station to advance the articles forwardly through the stations, means pivotally mounted on said transfer bar adjacent each of said feed units for pivotally moving said feed units about said shaft means from idle to feed positions, and sensing means at each station operable to sense the absence of an article, said sensing means being operatively associated with said moving means to cause all feed units behind an empty station to move to feed positions during rearward movement of said transfer bar from said start position.

13. An accumulating conveyor comprising an elongated support along which a plurality of articles are movable forwardly through a series of longitudinally spaced-apart stations, a transfer bar mounted for movement back and forth longitudinally of said elongated support, a plurality of feed units spaced apart on said transfer bar longitudinally of said elongated support and movable between idle and feed positions, drive means for moving said transfer bar through a cycle commencing with said transfer bar at a start position for moving each of said feed units from one station to the next adjacent station to advance the articles forwardly through the stations, means for moving said feed units from idle to feed positions, and sensing means at each station operable to sense the absence of an article, said sensing means being operatively associated with said moving means to cause all feed units behind an empty station to move to feed positions in response to an initial rearward movement of said transfer bar from said start position, wherein said means for moving said feed units from idle to feed positions includes a plurality of feed unit setting assemblies on said transfer bar movable between rest and operative positions for moving associated feed units to feed positions, actuator members movable mounted on said elongated support at said stations and movable between operative and inoperative positions, said sensing means being operatively associated with a corresponding actuator member at the next following station, and interference means on said actuator members and on said feed unit setting assemblies, said sensing means at an empty station causing said corresponding actuator member at the next following station to be maintained in said operative position, said interference means on said corresponding actuator member and an associated feed unit setting assembly acting to move said associated feed unit setting assembly to the actuated position in response to the initial rearward movement of said transfer bar to move the feed unit to the feed position at the station next following said empty station.

14. The accumulating conveyor according to claim 13, wherein said sensing means at each station comprises a sensing member pivotally mounted on said elongated support and pivotally movable between an article-sensed position and an empty station position, means biasing said sensing member to the empty station position, and catch means on said sensing member and on the corresponding actuator member acting to hold said corresponding actuator member behind an empty station in the operative position enabling the interference means on said corresponding actuator member and said associated feed unit setting assembly to move said associated feed unit setting assembly to the actuated position in response to the initial rearward movement of said transfer bar.

15. The accumulating conveyor according to claim 14 and further including flexible connecting means connecting adjacent ones of said actuator members and acting to hold in operative positions all actuator members behind an actuator member maintained in the operative position by a sensor member at an empty station.

16. The accumulating conveyor according to claim 13, wherein said feed unit setting assemblies are pivotally mounted on said transfer bar for pivotal movement between rest and actuated positions, each of said feed units being pivotally mounted on said transfer bar for pivotal movement between said idle and feed positions through an angle no larger than forty-five degrees.

17. An accumulating lift and carry conveyor comprising an elongated support along which a plurality of articles are movable through a series of longitudinally spaced-apart stations, a transfer bar mounted for movement forwardly and rearwardly longitudinally of said elongated support, and for up and down movement relative to said elongated support, a plurality of feed units on said transfer bar movable between idle and feed positions, drive means for moving said transfer bar up and down and back and forth through a work cycle commencing with the transfer bar in a start position for moving each of said feed units from one station to the next adjacent station to advance the articles to fill any empty stations, a plurality of feed unit setting assemblies on said transfer bar operatively associated with said feed units, each of said feed unit setting assemblies being movable between rest and actuated positions and being operable when moved to the actuated position to move an associated feed unit to the feed position, a plurality of actuator members mounted at said stations for movement between operative and inoperative positions, each of said actuator members being operatively associated with a separate feed unit setting assembly, sensing means at each station for sensing the absence of an article, each of said sensing means being operatively associated with a corresponding actuator member at the next following station, and means connecting adjacent ones of said actuator members and operable to maintain all actuator members in operative positions behind a first actuator member maintained in said operative position, said sensing means at an empty station causing the corresponding actuator member to be maintained in an operative position so that upon an initial rearward movement of said transfer bar from said start position said feed unit setting assemblies engage all actuator members held in operative positions and in response to such engagement move to actuated positions to move their associated feed units to feed positions, said drive means next being operable to raise said transfer bar so that all feed units in feed positions engage and lift the articles from the stations following said empty station and thereafter being operable to advance said lifted articles to their next adjacent stations.

18. An accumulating conveyor comprising an elongated support along which a plurality of articles are movable through a series of longitudinally spaced-apart stations, a transfer bar mounted for movement forwardly and rearwardly longitudinally of said elongated support, a plurality of feed units on said transfer bar corresponding to said stations and movable between idle and feed positions, drive means for moving said transfer bar back and forth through a work cycle commencing with the transfer bar in a start position for moving each of said feed units from one station to the next adjacent station to advance the articles to fill any empty stations, a plurality of sensor assemblies corresponding to said stations and including sensing means at each station for sensing the absence of an article, each of said sensing means being operatively associated with a corresponding feed unit at the next following station and means connecting adjacent ones of said sensor assemblies to provide for movement of all feed units behind a first sensor assembly sensing the absence of an article to feed positions in response to an initial movement of said transfer bar from said start position and to maintain said feed units in said feed positions during advance of said transfer bar to move articles forwardly along said support during movement of said transfer bar through a work cycle.

19. The accumulating conveyor according to claim 18 wherein said means connecting adjacent ones of said sensor assemblies is a flexible connector.

* * * * *